US012639533B2

(12) United States Patent　　　　　(10) Patent No.:　US 12,639,533 B2

UzZaman et al.　　　　　　　　　　　(45) Date of Patent:　May 26, 2026

(54) EFFICIENT AND SCALABLE DEVELOPMENT OF MULTILINGUAL SUPERVISED MACHINE LEARNING TOOLS USING MACHINE TRANSLATION AND MULTILINGUAL EMBEDDINGS

(71) Applicant: SocialTrendly, Inc., Rochester, NY (US)

(72) Inventors: Naushad UzZaman, Bellmore, NY (US); Brandon Janes, Rochester, NY (US); Vanya Cohen, Rochester, NY (US); Paul Burkard, Kure Beach, NC (US)

(73) Assignee: SocialTrendly, Inc., Rochester, NY (US)

( * ) Notice: Subject to any disclaimer, the term of this patent is extended or adjusted under 35 U.S.C. 154(b) by 310 days.

(21) Appl. No.: 18/421,305

(22) Filed: Jan. 24, 2024

(65) Prior Publication Data

US 2024/0249085 A1　　Jul. 25, 2024

Related U.S. Application Data

(60) Provisional application No. 63/441,053, filed on Jan. 25, 2023.

(51) Int. Cl.
*G06F 40/58*　　　(2020.01)
*G06F 40/30*　　　(2020.01)
*G06Q 10/40*　　　(2026.01)

(52) U.S. Cl.
CPC .............. *G06F 40/58* (2020.01); *G06F 40/30* (2020.01); *G06Q 10/40* (2026.01)

(58) Field of Classification Search
None
See application file for complete search history.

(56) References Cited

U.S. PATENT DOCUMENTS

| | | | | |
|---|---|---|---|---|
| 11,048,887 | B1 * | 6/2021 | Gupta | ..................... G06F 40/44 |
| 2023/0281399 | A1 * | 9/2023 | Lamba | ................... G06F 40/30 |
| | | | | 704/2 |
| 2024/0013055 | A1 * | 1/2024 | Liu | ........................ G06N 3/096 |

* cited by examiner

*Primary Examiner* — Antim G Shah
(74) *Attorney, Agent, or Firm* — POLSINELLI LLP

(57) ABSTRACT

Disclosed embodiments may provide techniques for training a machine-learning model using machine translation and multilingual embeddings. A computer-implemented method can include receiving a source document that includes text segments associated with a source language. In some instances, one or more of the text segments are associated with a target label. The computer-implemented method can also include translating the text of the source document to generate a set of translated documents that include text associated with a target language. The computer-implemented method can also include generating a set of labeled multilingual documents by mapping the target label of the source document to corresponding text segments of the set of translated documents. The computer-implemented method can also include encoding the text of the set of labeled multilingual documents into a plurality of multilingual embeddings. The computer-implemented method can also include training a machine-learning model using the plurality of multilingual embeddings.

17 Claims, 6 Drawing Sheets

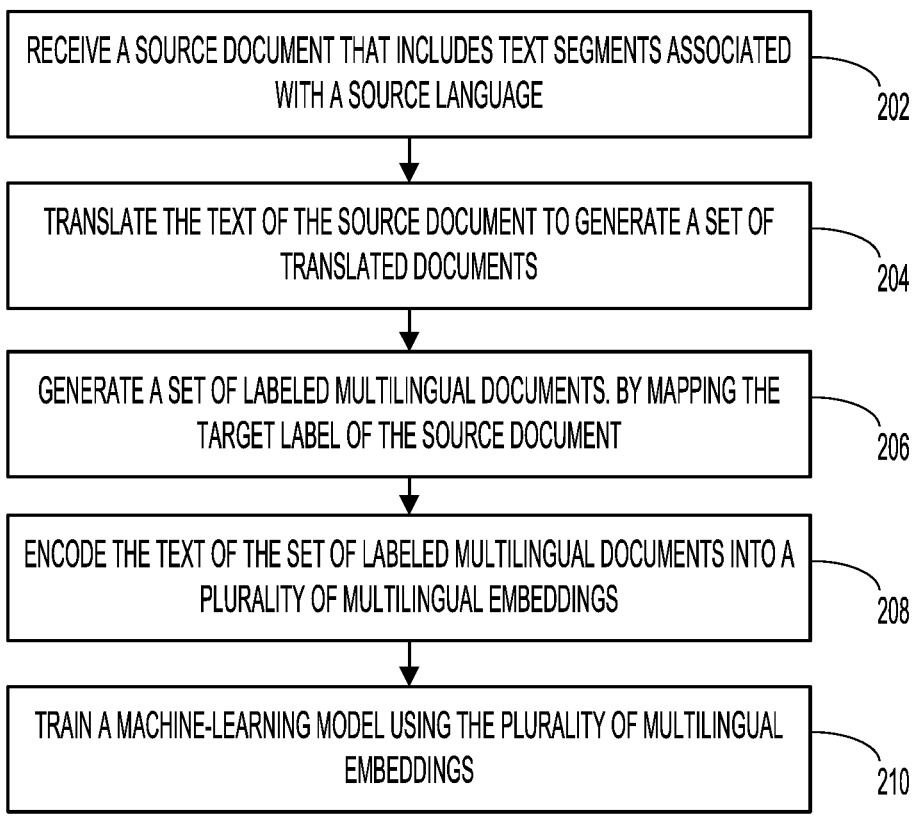

RECEIVE A SOURCE DOCUMENT THAT INCLUDES TEXT SEGMENTS ASSOCIATED WITH A SOURCE LANGUAGE — 202

TRANSLATE THE TEXT OF THE SOURCE DOCUMENT TO GENERATE A SET OF TRANSLATED DOCUMENTS — 204

GENERATE A SET OF LABELED MULTILINGUAL DOCUMENTS. BY MAPPING THE TARGET LABEL OF THE SOURCE DOCUMENT — 206

ENCODE THE TEXT OF THE SET OF LABELED MULTILINGUAL DOCUMENTS INTO A PLURALITY OF MULTILINGUAL EMBEDDINGS — 208

TRAIN A MACHINE-LEARNING MODEL USING THE PLURALITY OF MULTILINGUAL EMBEDDINGS — 210

Change in f1 micro
before and after adding translated samples

|  | English | Arabic | Russian | Spanish |
|---|---|---|---|---|
| Anger | 0.45/0.51 | 0.03/0.18 | 0.05/0.47 | 0.02/0.13 |
| Disgust | 0.34/0.45 | 0.04/0.49 | 0.00/0.47 | 0.00/0.04 |
| Fear | 0.47/0.57 | 0.00/0.49 | 0.00/0.57 | 0.00/0.35 |
| Joy | 0.75/075 | 0.19/0.57 | 0.04/0.41 | 0.07/0.46 |
| Neutral | 0.61/0.60 | 0.22/0.07 | 0.32/0.24 | 0.33/0.35 |
| Sadness | 0.50/0.52 | 0.10/0.49 | 0.02/0.54 | 0.00/0.09 |
| Surprise | 0.44/0.49 | 0.00/0.05 | 0.00/0.45 | 0.00/0.06 | baseline model / model trained with translated samples

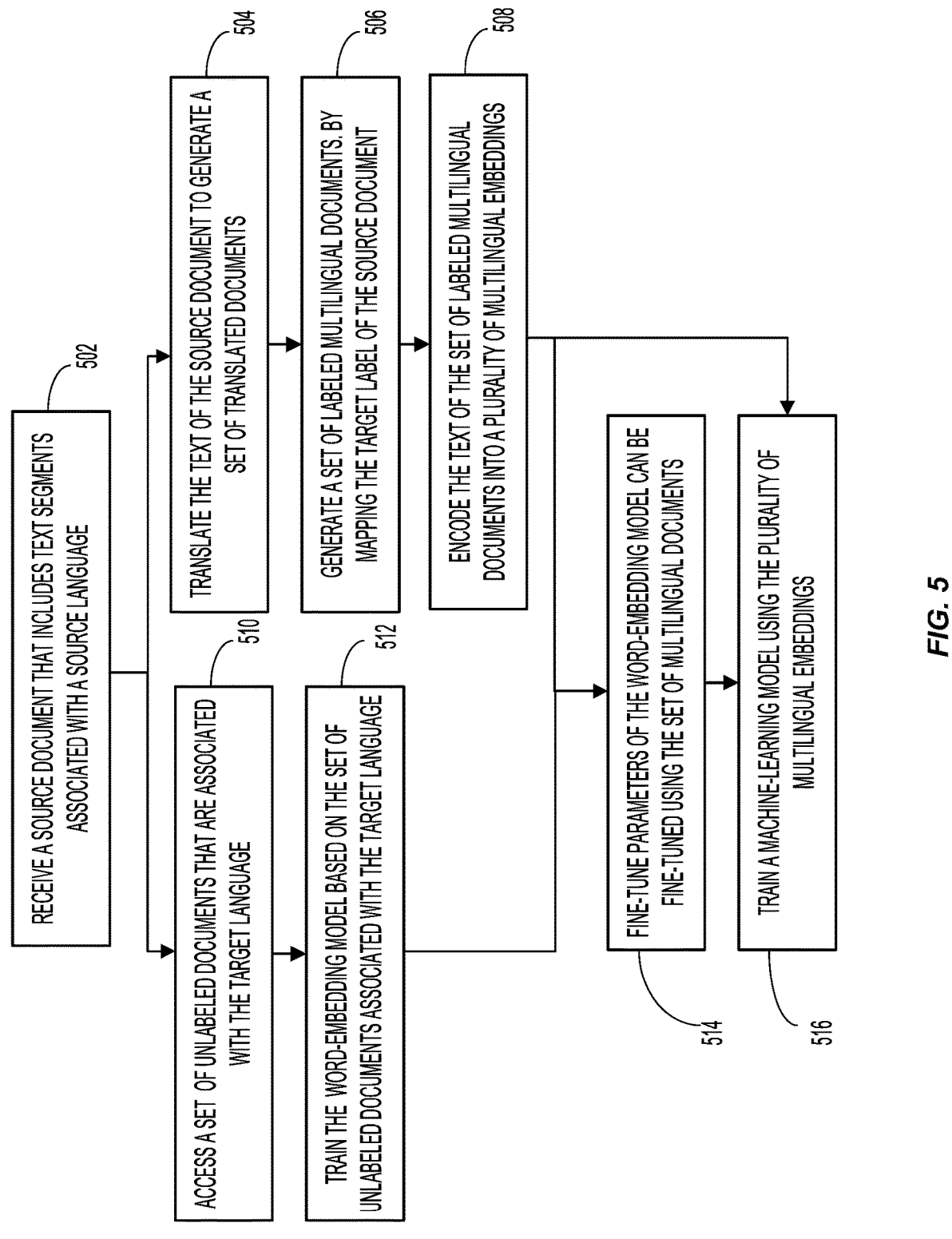

RECEIVE A SOURCE DOCUMENT THAT INCLUDES TEXT SEGMENTS ASSOCIATED WITH A SOURCE LANGUAGE — 502

TRANSLATE THE TEXT OF THE SOURCE DOCUMENT TO GENERATE A SET OF TRANSLATED DOCUMENTS — 504

GENERATE A SET OF LABELED MULTILINGUAL DOCUMENTS, BY MAPPING THE TARGET LABEL OF THE SOURCE DOCUMENT — 506

ENCODE THE TEXT OF THE SET OF LABELED MULTILINGUAL DOCUMENTS INTO A PLURALITY OF MULTILINGUAL EMBEDDINGS — 508

ACCESS A SET OF UNLABELED DOCUMENTS THAT ARE ASSOCIATED WITH THE TARGET LANGUAGE — 510

TRAIN THE WORD-EMBEDDING MODEL BASED ON THE SET OF UNLABELED DOCUMENTS ASSOCIATED WITH THE TARGET LANGUAGE — 512

FINE-TUNE PARAMETERS OF THE WORD-EMBEDDING MODEL CAN BE FINE-TUNED USING THE SET OF MULTILINGUAL DOCUMENTS — 514

TRAIN A MACHINE-LEARNING MODEL USING THE PLURALITY OF MULTILINGUAL EMBEDDINGS — 516

FIG. 5

EFFICIENT AND SCALABLE DEVELOPMENT OF MULTILINGUAL SUPERVISED MACHINE LEARNING TOOLS USING MACHINE TRANSLATION AND MULTILINGUAL EMBEDDINGS

CROSS-REFERENCES TO RELATED APPLICATIONS

The present application claims priority from and is a non-provisional of U.S. Provisional Application No. 63/441, 053, entitled "Efficient and Scalable Development of Multilingual Supervised Machine Learning Tools using Machine Translation and Multilingual Embeddings" filed Jan. 25, 2023, the contents of which are herein incorporated by reference in its entirety for all purposes.

FIELD

The present disclosure relates generally to natural-language processing (NLP) of documents in various languages. In one example, the systems and methods described herein may be used to train a machine-learning model using machine translation and multilingual embeddings.

SUMMARY

Disclosed embodiments may provide techniques for training a machine-learning model using machine translation and multilingual embeddings. A computer-implemented method can include receiving a source document that includes text segments associated with a source language. In some instances, one or more of the text segments are associated with a target label. The computer-implemented method can also include translating the text of the source document to generate a set of translated documents, in which one or more translated documents of the set include text associated with a target language. The computer-implemented method can also include generating a set of labeled multilingual documents. Generating the set of labeled multilingual documents can include mapping the target label of the source document to corresponding text segments of the set of translated documents.

The computer-implemented method can also include encoding the text of the set of labeled multilingual documents into a plurality of multilingual embeddings. The computer-implemented method can also include training a machine-learning model using the plurality of multilingual embeddings. In some instances, training the machine-learning model includes: (i) applying the machine-learning model to the plurality of multilingual embeddings to generate an initial output; (ii) comparing the initial output with the target label; and (iii) adjusting parameters of the machine-learning model based on the comparison such that the trained machine-learning model generates a target output that corresponds to the target label.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

FIG. 2 shows an illustrative example of a process for training a machine-learning model using machine translation and multilingual embeddings, in accordance with some embodiments.

FIG. 5 shows an illustrative example of a process for training a machine-learning model using multilingual embeddings generated from a trained word-embedding model, in accordance with some embodiments.

Figure 1:
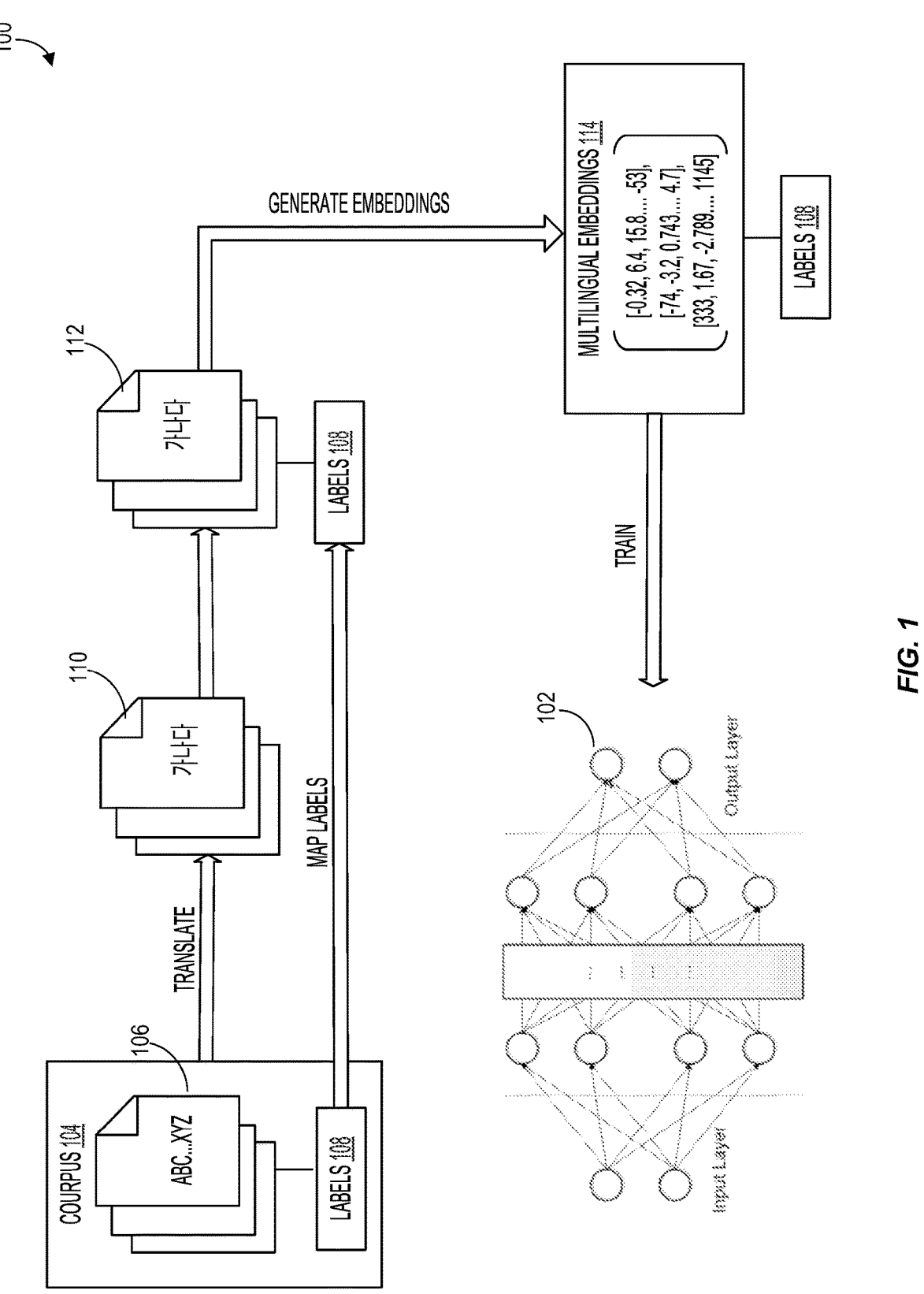
FIG. 1 illustrates an example schematic diagram for training a machine-learning model using machine translation and multilingual embeddings, according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Natural language processing (NLP) is a form of artificial intelligence that allows computers to understand human language. In particular, machine-learning models can be trained to interpret, manipulate, and comprehend human language, at which the machine-learning models can perform a variety of tasks based on such understanding of the human language. As an illustrative example, a machine-learning model can be trained to predict whether a text corpus includes a narrative attack against one or more entities. In another example, another machine-learning model can be trained to identify a sentiment (e.g., positive, negative, neutral) associated with a particular document.

In some instances, the machine-learning models are trained to process documents in different languages to perform a given task. However, training the machine-learning models to process different languages can be challenging, as it requires the machine-learning models to recognize different characters as well as identifying new vocabulary and grammar rules. Conventional NLP techniques in the field typically resort to using human annotation in target languages for the development of the machine learning models, which can be costly and time-consuming. The above problem can make it difficult to scale the machine-learning models to process multiple languages and thus hinder the ability to serve a diverse set of users. As a result, conventional NLP techniques may only serve users of high-resource languages, such as English, and fail to support other languages.

To address the above-noted deficiencies, disclosed embodiments may provide techniques for using machine-assisted translation techniques and multilingual embeddings to train a machine learning model to process different languages. For example, multilingual embeddings associated with different target languages (e.g., Spanish, Chinese, Arabic) can be generated from a document with a source language (e.g., English), which can result in efficient training of the machine-learning model to process the target languages. The present techniques can thus enable an efficient, scalable development of multilingual machine-learning tools without the necessity of human annotation in target languages. As a result, the present techniques can address the limitation of scalability and language support that are present in the conventional techniques.

The machine-learning models can be trained to implement a variety of NLP tasks in different languages. An example of such applications can include text generation systems that can generate text based on a given input or seed text in different languages. These systems can be used for tasks such as summarization, text completion, and language-based creative tasks. Another example can include dialogue systems such as chatbots, virtual assistants, and interactive language-based games that can process different languages and be used in customer service, e-commerce, and gaming industries. Other examples can include: (i) sentiment analysis and opinion mining systems for analyzing sentiments in text data, which can be applied in industries such as marketing, customer service, and social media monitoring; and (ii) named-entity recognition and text classification systems that can be used in various industries such as legal, finance, healthcare and so on. Accordingly, the present techniques can be used to produce a wide range of NLP related products and devices, compositions and other useful items that can be used in various industries, and improve the efficiency, scalability, and effectiveness of natural language processing tasks.

I. Techniques for Training a Machine-Learning Model Using Machine Translation and Multilingual Embeddings

A. Example Implementation

FIG. 1 illustrates an example schematic diagram 100 for training a machine-learning model using machine translation and multilingual embeddings, according to some embodiments. A training system can receive a corpus of source documents in one or more source languages (e.g., English). Each of the source documents includes one or more labels. The training system can translate the documents of the corpus into translated documents associated with target languages (e.g., Arabic, Japanese, Spanish) using machine translation or machine-assisted translation. The training system can map the labels of the source documents of the corpus to the translated documents to generate a set of labeled multilingual documents.

The training system can then preprocess the labeled multilingual documents by generating a plurality of multilingual embeddings that represent text of the translated documents. The training system can train a machine-learning model for an NLP task using the plurality of multilingual embeddings as input. The training can include adjusting parameters of the machine-learning model by comparing an output of the machine-learning model and the labels associated with the inputted multilingual embeddings. After training, the training system can deploy the machine-learning model to perform the NLP tasks by processing unlabeled text data with the target language.

1. Model Selection

As shown in FIG. 1, training techniques using machine-translation and multilingual embeddings can be initiated by a training system accessing an initial machine-learning model 102 from a models database (not shown). As an illustrative example, the machine-learning model 102 can be an artificial neural network selected from the models database. The neural network can be defined by an example neural network description for machine learning in a neural controller, which can be the same as a processing unit inside a mobile device. Neural network description can include a full specification of the neural network, including the neural architecture. For example, the neural network description can include a description or specification of architecture of the neural network (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc. and so forth.

The neural network can reflect the architecture defined in neural network description. In this non-limiting example, the neural network includes an input layer, which includes input data, which can be any type of data such as media content (images, videos, etc.), numbers, text, etc. In one illustrative example, the input layer can process embeddings or feature vectors that represent a set of documents having text in a particular language (e.g., Korean). In another example, the input layer can process data representing a portion of the input media data, such as a patch of data or pixels (e.g., a $128 \times 128$ patch of data) in an image corresponding to the input media data.

The neural network can include one or more hidden layers. The hidden layers can include n number of hidden layers, where n is an integer greater than or equal to one. The number of hidden layers can include as many layers as needed for a desired processing outcome and/or rendering intent. The neural network further includes an output layer that provides an output resulting from the processing performed by the hidden layers.

The neural network, in this example, is a multi-layer neural network of interconnected nodes. Each node can represent a piece of information. Information associated with the nodes is shared among the different layers and each layer retains information as information is processed. In some cases, the neural network can include a feed-forward neural network, in which case there are no feedback connections where outputs of the neural network are fed back into itself. In other cases, the neural network can include a recurrent neural network, which can have loops that allow information to be carried across nodes while reading in input.

Information can be exchanged between nodes through node-to-node interconnections between the various layers. Nodes of input layer can activate a set of nodes in the first hidden layer. For example, as shown, each input node of input layer is connected to each node of first hidden layer. Nodes of hidden layer can transform the information of each input node by applying activation functions to the information. The information derived from the transformation can then be passed to and can activate the nodes of the next hidden layer, which can perform their own designated functions. Example functions include convolutional, up-sampling, data transformation, pooling, and/or any other suitable functions. The output of hidden layer (e.g.,) can then activate nodes of the next hidden layer, and so on. The output of last hidden layer can activate one or more nodes of output layer, at which point an output is provided. In some cases, while nodes in the neural network are shown as having multiple output lines, a node has a single output and all lines shown as being output from a node represent the same output value.

In some cases, each node or interconnection between nodes can have a weight that is a set of parameters derived from training the neural network. For example, an interconnection between nodes can represent a piece of information learned about the interconnected nodes. The interconnection can have a numeric weight that can be tuned (e.g., based on a training dataset), allowing the neural network to be adaptive to inputs and able to learn as more data is processed.

In some instances, the neural network is pre-trained to process the features from the data in the input layer using different hidden layers in order to provide the output through the output layer.

The neural network can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network can represent any other neural or deep learning network, such as an autoencoder, a deep belief nets (DBNs), a recurrent neural networks (RNNs), etc.

Neural Architecture Search (NAS) involves a process in which neural controller searches through various types of neural networks such as CNNs, DBNs, RNNs, etc., to determine which type of neural network, given the input/output description of neural network description, can perform closes to the desired output once trained. This search process is currently cumbersome and resource intensive, because every type of available neural network is treated as a "blackbox." In other words, a neural controller selects an available neural network (a blackbox), trains it, validates it and either selects it or not depending on the validation result. However, each available example or type of neural network is a collection of nodes. As will be described below, the present disclosure enables gaining insight into performance of each individual node to assess its performance, which then allows the system to select a hybrid structure of nodes that may or may not be the same as a given particular structure of a neural network currently available. In other words, the present disclosure enables an AutoML system to pick and choose nodes from different available neural networks and create a new structure that performs best for a given application.

In addition to the neural network, the machine-learning model can include any type of machine-learning model such as, but not limited to, a classifier (e.g., single-variate or multivariate that is based on k-nearest neighbors, Naïve Bayes, Logistic regression, support vector machine, decision trees, an ensemble network of classifiers, and/or the like), regression model (e.g., such as, but not limited to, linear regressions, logarithmic regressions, Lasso regression, Ridge regression, and/or the like), clustering model (e.g., such as, but not limited to, models based on k-means, hierarchical clustering, DBSCAN, biclustering, expectation-maximization, random forest, and/or the like), deep learning model (e.g., such as, but not limited to, neural networks, convolutional neural networks, recurrent neural networks, long short-term memory (LSTM), multilayer perceptions, etc.), combinations thereof (e.g., disparate-type ensemble networks, etc.), or the like.

2. Generating Multilingual Embeddings from Source Data

Once the machine-learning model 102 is selected, the training system can access a corpus 104, which can be transformed into training and test data sets for training the machine-learning model. The training of the machine-learning model 102 using the corpus 104 can facilitate the machine-learning model 102 to perform a given NLP task (e.g., sentiment analysis, text generation). The corpus 104 can include one or more source documents 106. Source document 106 can be any data object that includes text and/or images, including news articles, reports, white papers, text messages, web pages, and emails. The source document 106 can include structured and/or unstructured text data and can be accessed from internal and/or external databases. In some instances, text of the source document is extracted from other types of media content, such as audio or video recordings. For example, the source document 106 can include conversation data between two or more users or text extracted from short-form video content accessed from a social-media platform.

Each of the source documents 106 can include text associated with a source language. The source language can correspond to any type of language used by users. Examples of source languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai. As an illustrative example, the source documents 106 include text in English. In some instances, a given source document can include multiple source languages, such as English and Spanish.

In some instances, one or more text segments of the source document 106 are associated with a target label 108. A text segment can include any type of a linguistic unit, including words, phrases, sentences, or paragraphs. The target label 108 can identify one or more characteristics of a corresponding text segment of the source document 106. For example, if an NLP task includes classifying portions of inputted text into one or more sentiment categories (e.g., positive, neutral, negative), each target label 108 of the source documents 106 can correspond to one of the sentiment categories. In some instances, the target labels 108 applied to the source documents 106 can be configured to identify 2, 3, 4, 5, 10, 15, 20, 30, 50, or more than 50 classifications.

The training system can translate the text of one or more of the source documents 106 to generate a set of translated documents 110. One or more translated documents of the set of translated documents 110 can include text associated with a target language. The target language can include any type of language that is different from the source language of the source documents 106. As shown in FIG. 1, the target language of the set of translated documents 110 include Korean, which is different from the source language of the source documents 106 (i.e., English). Examples of target languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, the training system translates the text of the source documents 106 by applying a machine-translation algorithm to the source document to generate the set of translated documents 110. Machine translation can include rule-based approaches to translation of text or speech from one language to another, including the contextual, idiomatic and pragmatic nuances of both languages. The machine-translation algorithm can thus include data-processing rules for converting documents having an original language (e.g., English) to documents having a target language (e.g., Korean). In some instances, the machine translation also includes machine-learning techniques for processing the source documents 106 to generate the set of translated documents 110. Examples of the machine-translation algorithm can include, but are not limited to, GOOGLE Translate (google.com/translate), MICROSOFT Translator (microsofttranslator.com), PROMT (promt.com), SYSTRAN (systransoft.com), and IBM n.Fluent (www.research.ibm.com/social/projects_nfluent.html).

The training system can generate a set of labeled multilingual documents 112 by mapping the target labels 108 of the source documents 106 to corresponding text segments of the set of translated documents 110. Mapping can be performed by iterating through each text segment of the source documents 106, such that any n-th text segment having the target label 108 can be mapped to a corresponding n-th text segment of the translated documents 110.

For example, in the case of the NLP task associated with named-entity recognition (NER), a full document is not tagged as a single unit but rather tokens or individual words within a document can be labeled with named entity tags, such as ORGANIZATION, PERSON or LOCATION. For example, in the document, "My uncle spent three years in a Warsaw basement," the token, "Warsaw" can be tagged as "LOCATION." Using the translation system described herein, the tags applied to tokens from the source language can be applied to tokens or words in the target language. The mapping of the target labels 108 can eliminate the need of manual annotation in target languages, thus reducing the cost and effort required for creating the training data set.

The training system can encode the text of the set of labeled multilingual documents 112 into a plurality of multilingual embeddings 114. A multilingual embedding can include a set of values (e.g., a numerical array) that represent text tokens of the multilingual documents 112 in a low-dimensional vector space, in which the multilingual embedding can be used as input to the machine-learning model 102. Example techniques for generating embeddings can include term frequency-inverse document frequency (TF-IDF) techniques, bag-of-words, and tokenization techniques. Generating multilingual embeddings 114 can allow the model to understand the meaning and context of the words in multiple languages, which is necessary for the machine learning model to perform well on the NLP tasks.

In some instances, the training system associates the plurality of multilingual embeddings 114 with the corresponding labels 108. For example, the training system can identify a label of a particular text token of the multilingual documents 112 and associate the label with a multilingual embedding that corresponds to the particular text token. The training system can repeat the above identifying and associating steps across other labels, such that the plurality of multilingual embeddings 114 are associated with the corresponding labels 108. The association of the labels 108 can facilitate training of the machine-learning model, including comparing an output based on a particular multilingual embedding with a corresponding target label.

In some instances, the training system applies a word-embedding model to the text of the set of labeled multilingual documents 112 to generate the plurality of multilingual embeddings 114. The word-embedding model can be a machine-learning model trained to encode individual words into a real-valued vectors in a lower-dimensional space, in which words with similar meanings would be represented in similar values. The word-embedding model can generate the multilingual embeddings 114 by capturing inter-word semantics of the multilingual documents 112. The word-embedding model can be trained using a set of unlabeled documents that include text associated with the target language (e.g., Korean).

3. Training

Once the multilingual embeddings 114 are generated, the training system can train the machine-learning model 102 using the plurality of multilingual embeddings 114. In some instance, training the machine-learning model 102 includes: (i) applying the machine-learning model 102 to the plurality of multilingual embeddings to generate an initial output; (ii) comparing the initial output with the target label; and (iii) adjusting parameters of the machine-learning model 102 based on the comparison such that the trained machine-learning model 102 generates a target output that corresponds to the target label.

To initiate training, the training system can split the multilingual embeddings 114 into two classes of data called training data set and test data set. For example, 70% of the accessed data from a pool of the multilingual embeddings 114 may be used as part of the training data set while the remaining 30% of the accessed data from the pool may be used as part of the test data set. The percentages according to which the pool of the data are split into training data set and test data set is not limited to 70/30 and may be set according to a configurable accuracy requirement and/or error tolerance (e.g., the split can be 10/50, 60/40, 70/30, 80/20, 90/10, etc. between the two data sets).

The training subsystem can then use the training dataset (e.g., the multilingual embeddings 114 and the corresponding labels 108) to train the machine-learning model 102 by calculating a loss based on a comparison between an output generated from the machine-learning model and a corresponding label of the training data. With each output generated by the machine-learning model 102, the label can thus be used to correct the output of the machine-learning model 102. In some instances, reinforcement learning is additionally performed by utilizing feedback from users to adjust the corresponding parameters of the machine-learning model. As noted, weights of different nodes of the machine-learning model 102 may be adjusted/tuned during the training process to improve resulting output.

During training, weights of nodes associated with the machine-learning model 102 can be adjusted using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training media data until the weights of the layers are accurately tuned. In particular, the training of the machine-learning model 102 (e.g., adjustment of the weights) can be performed until a corresponding loss (e.g., a mean square error) reaches a minimum threshold.

Once trained, the training system can test the machine-learning model 102 using the test data set. Examples of testing methods can include regression testing, unit testing, beta testing, and alpha testing. Once the result of testing the machine-learning model 102 is satisfactory (e.g., when outputs of the testing stage is greater than or equal to a threshold or incorrect detections are less than a threshold), the training system can deploy the trained machine-learning model 102 (which may also be referred to as a trained machine learning model or machine trained neural network) to an NLP tool, which can use the trained machine-learning model 102 to perform the NLP tasks.

4. Deployment

After accessing the trained machine-learning model 102, the training system can deploy the machine-learning model 102 to perform the NLP task. The machine learning model can process unlabeled input data in different languages to perform various NLP tasks such as text classification, sentiment analysis, language identification, language generation, etc.

As described herein, the machine-learning models can be trained using the multilingual embeddings 114 to implement a variety of NLP tasks in different languages. In some instances, the labels 108 that identify different characteristics of the text segments (e.g., intent, entities, sentiment) are used to further train the machine-learning models, such that the trained machine-learning model recognizes content and different patterns associated with the inputted text.

An example NLP task includes text generation systems that can generate text based on a given input or seed text in different languages. These systems can be used for tasks such as summarization, text completion, and language-based creative tasks in target languages. For the text generation systems, the machine-learning model can be a BART network, generative pre-trained transformer (GPT), or Generative adversarial networks (GAN) that is trained using the multilingual embeddings 114 to facilitate generating text in target languages (e.g., Korean, Spanish). In some instances, the machine-learning model performs abstractive summarization to create new text segments that are not described in the source documents but still convey similar meaning.

Another example NLP task can include dialogue systems such as chatbots, virtual assistants, and interactive language-based games that can process different languages. For the dialogue systems, the machine-learning model can include a Naïve Bayes algorithm, a support vector machine, recurrent neural networks (RNN), long short-term memory (LSTM) networks, or Markov models that can be trained using the multilingual embeddings 114 to facilitate generating text in dialogue systems in target languages.

The NLP task can also include sentiment analysis and opinion mining systems for analyzing sentiments in text data across different languages. The machine-learning model can be an artificial neural network trained using the multilingual embeddings 114 and the target labels 108 that indicate a sentiment associated with a corresponding text segment (e.g., positive, negative, neutral). Similar to sentiment analysis, named-entity recognition and text classification systems (e.g., hate-speech classification) can be implemented using the machine-learning models, in which the machine-learning models can be trained using the multilingual embeddings 114 and the target labels 108 that indicate whether a corresponding text segment includes hate speech (for example).

B. Methods

FIG. 2 shows an illustrative example of a process 200 for training a machine-learning model using machine translation and multilingual embeddings, in accordance with some embodiments. For illustrative purposes, the process 200 is described with reference to the components illustrated in FIG. 1, though other implementations are possible. For example, the program code for a training system is executed by one or more processing devices to cause a server system (e.g., the computing device 602 of FIG. 6) to perform one or more operations described herein.

At step 202, a training system receives a source document that includes text segments associated with a source language. The source document can be any data object that includes text and/or images, including news articles, reports, white papers, text messages, web pages, and emails. The source document can include structured and/or unstructured text data and can be accessed from internal and/or external databases. In some instances, text of the source document is extracted from other types of media content, such as audio or video recordings. For example, the source document can include conversation data between two or more users or text extracted from short-form video content accessed from a social-media platform. The source language can correspond to any type of language used by users. Examples of source languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, one or more of the text segments are associated with a target label. A text segment can include any type of a linguistic unit, including words, phrases, sentences, or paragraphs. The target label can identify one or more characteristics of a corresponding text segment of the source document.

At step 204, the training system translates the text of the source document to generate a set of translated documents. The one or more translated documents of the set can include text associated with a target language. The target language can include any type of language that is different from the source language of the source documents 106. Examples of target languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, translating the text of the source document includes applying a machine-translation algorithm to the source document to generate the set of translated documents. Machine translation can include rule-based approaches to translation of text or speech from one language to another, including the contextual, idiomatic and pragmatic nuances of both languages. In some instances, the machine translation also includes machine-learning techniques for processing the source documents to generate the set of translated documents. Examples of the machine-translation algorithm can include, but are not limited to, GOOGLE Translate (google.com/translate), MICROSOFT Translator (microsofttranslator.com), PROMT (promt.com), SYSTRAN (systransoft.com), and IBM n.Fluent (www.research.ibm.com/social/projects_nfluent.html).

At step 206, the training system generates a set of labeled multilingual documents. Generating the set of labeled multilingual documents can include mapping the target label of the source document to corresponding text segments of the set of translated documents. For example, mapping can be performed by iterating through each text segment of the source documents, such that any n-th text segment having the target label can be mapped to a corresponding n-th text segment of the translated documents. The mapping of the target labels 108 can eliminate the need of manual annotation in target languages, thus reducing the cost and effort required for creating the training data set.

At step 208, the training system encodes the text of the set of labeled multilingual documents into a plurality of multilingual embeddings. A multilingual embedding can include a set of values (e.g., a numerical array) that represent text tokens of the multilingual documents in a low-dimensional vector space, in which the multilingual embedding can be used as input to the machine-learning model. Example techniques for generating embeddings can include term frequency-inverse document frequency (TF-IDF) techniques, bag-of-words, and tokenization techniques.

In some instances, a word-embedding model is applied to the text of the set of labeled multilingual documents to generate the plurality of multilingual embeddings. The word-embedding model can be a machine-learning model trained to encode individual words into a real-valued vectors in a lower-dimensional space, in which words with similar meanings would be represented in similar values. Examples of the word-embedding model can include a GloVe model or a Word2Vec model.

At step 210, the training system trains a machine-learning model using the plurality of multilingual embeddings. Training the machine-learning model includes: (i) applying the machine-learning model to the plurality of multilingual embeddings to generate an initial output; (ii) comparing the initial output with the target label; and adjusting parameters of the machine-learning model based on the comparison such that the trained machine-learning model generates a target output that corresponds to the target label.

In some instances, the machine-learning model is trained to predict whether a particular document includes narrative attacks against one or more entities, in which the target label identifies a classification indicating whether the text of the source language includes the narrative attack. Additionally or alternatively, the machine-learning model is trained to perform a sentiment analysis for a particular document, in which the target label identifies a particular sentiment associated with the text of the source language. Process 200 terminates thereafter.

II. Techniques for Training a Machine-Learning Model Using Multilingual Embeddings Generated from a Trained Word-Embedding Model

A. Example Implementation

Figure 3:
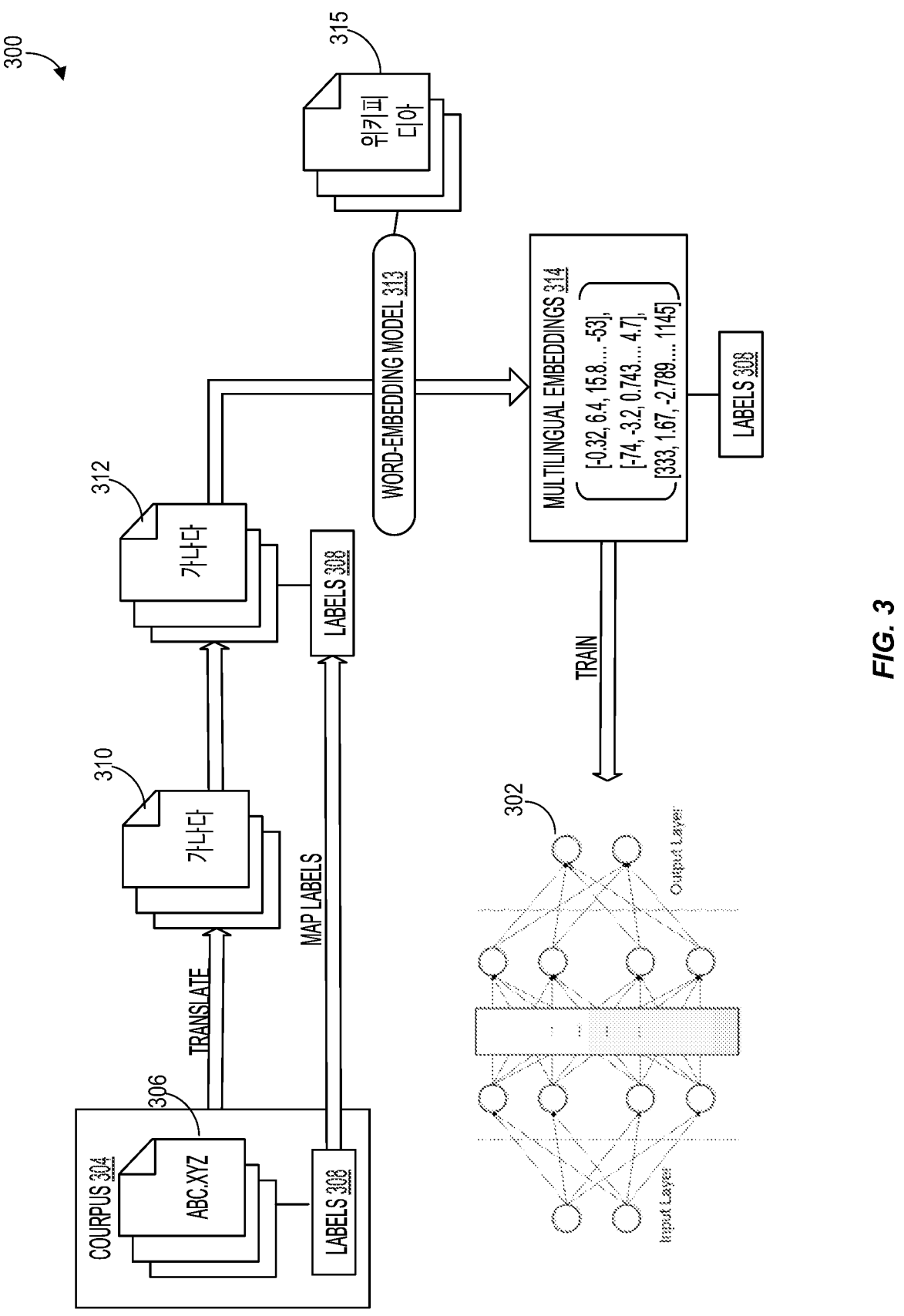
FIG. 3 illustrates an example schematic diagram for training a machine-learning model using multilingual embeddings generated from a trained word-embedding model, according to some embodiments.

FIG. 3 illustrates an example schematic diagram 300 for training a machine-learning model using multilingual embeddings generated from a trained word-embedding model, according to some embodiments. A training system can receive a corpus of source documents in one or more source languages. Each of the source documents includes one or more labels. The training system can translate the documents of the corpus into translated documents associated with target languages using machine translation or machine-assisted translation. The training system can map the labels of the source documents of the corpus to the translated documents to generate a set of labeled multilingual documents.

The training system can apply a trained word-embedding model to the labeled multilingual documents to generate a plurality of multilingual embeddings that represent text segments of the translated documents. The trained word-embedding model can be trained using an embedding-training dataset that includes a corpus of unlabeled documents that are associated with the target language. In some instances, the word-embedding model includes a pre-trained model that was trained using public datasets. Parameters of the trained word-embedding model can additionally be fine-tuned using the set of translated documents generated from the source documents.

The training system can then train a machine-learning model for an NLP task using the plurality of multilingual embeddings as input. The training can include adjusting parameters of the machine-learning model by comparing an output of the machine-learning model and the labels associated with the inputted multilingual embeddings. After training, the training system can deploy the machine-learning model to perform the NLP tasks by processing unlabeled text data with the target language.

1. Model Selection

As shown in FIG. 3, training techniques using machine-translation and multilingual embeddings can be initiated by a training system accessing an initial machine-learning model 302 from a models database (not shown). As an illustrative example, the machine-learning model 302 can be a convolutional neural network (CNN). The CNN accesses a matrix of multilingual embeddings (hereinafter referred to as an "embedding matrix") and applies a series of operations which form a single convolutional layer: (1) convolution; (2) batch normalization; and (3) max-pooling. To perform convolution, the CNN applies one or more filters including a matrix of values that can "slide over" the embedding matrix so as to generate a set of feature maps. A filter includes a matrix of numbers that are different from a matrix of values of another filter, in order to allow the filter to extract different features from the embedding matrix. In some instances, a set of hyperparameters that correspond to the feature map generation are predefined (e.g., based on manual input). Feature-extraction hyperparameters may identify (for example) a number of filters, a stride for each filter (e.g., 1-step, 2-step), a padding size, a kernel size, and/or a kernel shape. For example, the CNN applies 128 filters, each of which having a kernel size of 5. As a result, 128 feature maps are generated for the text segment.

The CNN can perform a batch normalization operation on the set of feature maps to generate a set of normalized feature maps. As used herein, batch normalization is a supervised learning technique that normalizes interlayer outputs (e.g., the set of feature maps) of a neural network into a standard format. Batch normalization effectively 'resets' a distribution of the output of the previous layer to be more efficiently processed by the subsequent layer.

After the batch normalization operation, the CNN performs a pooling operation on the set of normalized feature maps in order to reduce the spatial size of each feature map and subsequently generate a set of pooled feature maps. In some embodiments, the CNN performs the pooling operation to reduce dimensionality of the set of normalized feature maps, while retaining the semantic features captured by the embedding matrix. In some instances, the CNN system performs a max pooling operation to access a group of values within the feature map (e.g., 2 values within the feature map) and selects an element associated with the highest value. This operation can be iterated to traverse the entirety of each feature map of the set of normalized feature maps, at which the max pooling operation completes the generation of the set of pooled feature maps. For example, the CNN sets a pool size of 2 and reduces dimensions for each feature map of the set of normalized feature maps ("128") by half ("64"). As a result, a dimensionality for each pooled feature map is 64.

The CNN system may alternatively or additionally perform an average pooling operation in place of the max pooling operation which selects the sum or average value of the elements captured in the area within the feature map. By performing the pooling operations, the CNN system may achieve several technical advantages including capability of generating an input representation of the embedding matrix that allows reduction of number of parameters and computations within the CNN model.

The CNN can continue to apply one or more additional convolutional layers at which convolution and pooling operations are performed on the set of pooled feature maps. For example, the CNN generates a second set of feature maps by applying another set of filters to each feature map of the set of pooled feature maps. In addition, the CNN applies a global max pooling operation on the second set of feature maps such that a maximum value for each feature map is selected to form a second set of pooled feature maps.

The CNN applies a fully connected layer (alternatively, a dense layer) to the second set of pooled feature maps to generate a feature representation of the text segment of the input data. The fully connected layer includes a multi-layer perceptron network incorporating a softmax activation function or other types of linear or non-linear functions at an output layer. In some instances, the CNN uses the fully connected layer that accesses the extracted features and generates an output that includes a feature representation that identifies one or more semantic characteristics of the text segment. For example, the feature representation of the text segment is an array of values having an array size of 64. In some instances, the CNN performs the above operations through the remaining text segments represented by the multilingual embeddings, thereby generating feature representations that represent the multilingual embeddings.

The feature representations can then be used as an input for an output layer, which then performs a series of operations for generating an output associated with a given NLP task. In some instances, the output and the labels of the training dataset are used as input for loss functions to optimize the parameters in the CNN. An error value generated by the loss functions is used in backpropagation algorithms to adjust the parameters in the CNN and thus improve the accuracy of subsequent feature representations outputted by the CNN.

It will be appreciated that a different number of convolutional layers may be used (e.g., which may have an effect of repeating these operations can be repeated by the CNN system one or more times). In some instances, pooling operations are omitted for one or more convolutional layers applied by the CNN system. Different versions of the CNN architecture can be used by the CNN system, including but not limited to AlexNet, ZF Net, GoogLeNet, VGGNet, ResNets, DenseNet, etc.

In addition to the CNN, the machine-learning model can include any type of machine-learning model such as, but not limited to, a classifier (e.g., single-variate or multivariate that is based on k-nearest neighbors, Naïve Bayes, Logistic regression, support vector machine, decision trees, an ensemble network of classifiers, and/or the like), regression model (e.g., such as, but not limited to, linear regressions, logarithmic regressions, Lasso regression, Ridge regression, and/or the like), clustering model (e.g., such as, but not limited to, models based on k-means, hierarchical clustering, DBSCAN, biclustering, expectation-maximization, random forest, and/or the like), deep learning model (e.g., such as, but not limited to, neural networks, convolutional neural networks, recurrent neural networks, long short-term memory (LSTM), multilayer perceptions, etc.), combinations thereof (e.g., disparate-type ensemble networks, etc.), or the like.

2. Generating Multilingual Embeddings from Source Data

Once the machine-learning model 302 is selected, the training system can access a corpus 304, which can be transformed into training and test data sets for training the machine-learning model. The training of the machine-learning model 302 using the corpus 304 can facilitate the machine-learning model 302 to perform a given NLP task (e.g., sentiment analysis, text generation). The corpus 304 can include one or more source documents 306. Source document 306 can be any data object that includes text and/or images, including news articles, reports, white papers, text messages, web pages, and emails. The source document 306 can include structured and/or unstructured text data and can be accessed from internal and/or external databases. In some instances, text of the source document is extracted from other types of media content, such as audio or video recordings. For example, the source document 306 can include conversation data between two or more users or text extracted from short-form video content accessed from a social-media platform.

Each of the source documents 306 can include text associated with a source language. The source language can correspond to any type of language used by users. Examples of source languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai. As an illustrative example, the source documents 306 include text in English. In some instances, a given source document can include multiple source languages, such as English and Spanish.

In some instances, one or more text segments of the source document 306 are associated with a target label 308. A text segment can include any type of a linguistic unit, including words, phrases, sentences, or paragraphs. The target label 308 can identify one or more characteristics of a corresponding text segment of the source document 306. For example, if an NLP task includes classifying portions of inputted text into one or more sentiment categories (e.g., positive, neutral, negative), each target label 308 of the source documents 306 can correspond to one of the sentiment categories. In some instances, the target labels 308 applied to the source documents 306 can be configured to identify 2, 3, 4, 5, 10, 15, 20, 30, 50, or more than 50 classifications.

The training system can translate the text of one or more of the source documents 306 to generate a set of translated documents 310. One or more translated documents of the set of translated documents 310 can include text associated with a target language. The target language can include any type of language that is different from the source language of the source documents 306. As shown in FIG. 3, the target language of the set of translated documents 310 includes Korean, which is different from the source language of the source documents 306 (i.e., English). Examples of target languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, the training system translates the text of the source documents 306 by applying a machine-translation algorithm to the source document to generate the set of translated documents 310. Machine translation can include rule-based approaches to translation of text or speech from one language to another, including the contextual, idiomatic and pragmatic nuances of both languages. The machine-translation algorithm can thus include data-processing rules for converting documents having an original language (e.g., English) to documents having a target language (e.g., Korean). In some instances, the machine translation also includes machine-learning techniques for processing the source documents 306 to generate the set of translated documents 310. Examples of the machine-translation algorithm can include, but are not limited to, GOOGLE Translate (google.com/translate), MICROSOFT Translator (microsofttranslator.com), PROMT (promt.com), SYSTRAN (systransoft.com), and IBM n.Fluent (www.research.ibm.com/social/projects_nfluent.html).

The training system can generate a set of labeled multilingual documents 312 by mapping the target labels 308 of the source documents 306 to corresponding text segments of the set of translated documents 310. Mapping can be performed by iterating through each text segment of the source documents 306, such that any n-th text segment having the target label 308 can be mapped to a corresponding n-th text segment of the translated documents 310.

For example, in the case of the NLP task associated with named-entity recognition (NER), a full document is not tagged as a single unit but rather tokens or individual words within a document can be labeled with named entity tags, such as ORGANIZATION, PERSON or LOCATION. For example, in the document, "My uncle spent three years in a Warsaw basement," the token, "Warsaw" can be tagged as "LOCATION." Using the translation system described herein, the tags applied to tokens from the source language can be applied to tokens or words in the target language. The mapping of the target labels 108 can eliminate the need of manual annotation in target languages, thus reducing the cost and effort required for creating the training data set.

The training system can encode the text of the set of labeled multilingual documents 312 into a plurality of multilingual embeddings 314. A multilingual embedding can include a set of values (e.g., a numerical array) that represent text tokens of the multilingual documents 312 in a low-dimensional vector space, in which the multilingual embedding can be used as input to the machine-learning model 302. Example techniques for generating embeddings can include term frequency-inverse document frequency (TF-IDF) techniques, bag-of-words, and tokenization techniques. Generating multilingual embeddings 314 can allow the model to understand the meaning and context of the words in multiple languages, which is necessary for the machine learning model to perform well on the NLP tasks.

In some instances, the training system associates the plurality of multilingual embeddings 314 with the corresponding labels 308. For example, the training system can identify a label of a particular text token of the multilingual documents 312 and associate the label with a multilingual embedding that corresponds to the particular text token. The training system can repeat the above identifying and associating steps across other labels, such that the plurality of multilingual embeddings 314 are associated with the corresponding labels 308. The association of the labels 308 can facilitate training of the machine-learning model, including comparing an output based on a particular multilingual embedding with a corresponding target label.

3. Word-Embedding Models

In some instances, the training system applies a trained word-embedding model 313 to the text of the set of labeled multilingual documents 312 to generate the plurality of multilingual embeddings 314. The word-embedding model 313 can be a machine-learning model trained to encode individual words into real-valued vectors in a lower-dimensional space, in which words with similar meanings would be represented in similar values. The word-embedding model 313 can generate the multilingual embeddings 314 by capturing inter-word semantics of the multilingual documents 312. The word-embedding model 313 can be trained using a set of unlabeled documents that include text associated with the target language (e.g., Korean).

The word-embedding model 313 can be trained using an embedding-training dataset that includes a corpus 315 of unlabeled documents that are associated with the target language (e.g., Korean). Parameters of the trained word-embedding model 313 can additionally be fine-tuned using the set of translated documents 310 or the set of multilingual documents 312 that were generated from the source documents.

In some instances, the word-embedding model 313 includes a pre-trained model that was previously trained using public datasets, such as a Global Vectors for word representation (GloVe) model. GloVe is a global log-bilinear regression model that is configured to use a word-word co-occurrence matrix along with local context window methods to generate word embeddings in a low dimensional space. As discussed above, embedding of words is used by the computing device to produce item vector representations of the associated items. The item vectors are usable by an item recommendation system of a computing device to create an item similarity matrix through comparison of the item vectors, arithmetic that is based on the item vectors, and so on. Although GloVe is described in terms of using a word-word co-occurrence matrix where items are considered as words and items in sessions as sentences, an item-item co-occurrence matrix can also be used to generate item embeddings in the low dimensional space directly. For example, the GloVe model is able to make use of a conventional item-item co-occurrence matrix to produce more accurate item-item similarities through vector representation without necessarily converting items and sessions to words and sentences. The GloVe model has several advantages that make it suitable for the task of creating item vector representations. One such advantage is that the GloVe model efficiently leverages statistical information by training only on the nonzero elements in an item-item co-occurrence matrix, rather than on the entire sparse matrix or on individual context windows in a large corpus. Further, the representation deduction process in GloVe treats the distance between words to determine their relative similarity. Intuitively, this makes sense since items that are interacted with consecutively in a session are likely to be more similar than items that are separated by a larger number of items within a session. For example, consider items interacted with during two session streams. The first session comprising items I1, I2, I3, and I4 and the other comprising items I5, I6, I4, I1, and I7. By observing the two sessions it may be deduced that I2 and I3 are more similar than I5 and I7. This kind of relationship is captured by the GloVe word embedding model.

In some instances, word-embedding model 313 is a Word2Vec model. Word2Vec consists of two distinct models (CBOW and skip-gram), each of which defines two training methods (with/without negative sampling) and other variations, such as hierarchical softmax. Both CBOW and skip-gram are shallow 2-layer neural network models. The CBOW model is used for item recommendations since it more intuitively captures the problem domain.

In a typical CBOW embodiment the neural network is trained to predict the central word given the words that occur in a context window around it. The word representations are learned in such a way that a sequence of the words (or items) in the embedment may have an effect on performance. However, for item recommendations it is beneficial to learn word embeddings in an order agnostic manner. In order to make the model less sensitive to these orderings, the Word2Vec model includes a number of random permutations of the items in a user session to the training corpus.

4. Training

Once the multilingual embeddings 314 are generated, the training system can train the machine-learning model 302 using the plurality of multilingual embeddings 314. In some instance, training the machine-learning model 302 includes: (i) applying the machine-learning model 302 to the plurality of multilingual embeddings to generate an initial output; (ii) comparing the initial output with the target label; and (iii) adjusting parameters of the machine-learning model 302 based on the comparison such that the trained machine-learning model 302 generates a target output that corresponds to the target label.

To initiate training, the training system can split the multilingual embeddings 314 into two classes of data called training data set and test data set. For example, 70% of the accessed data from a pool of the multilingual embeddings 314 may be used as part of the training data set while the remaining 30% of the accessed data from the pool may be used as part of the test data set. The percentages according to which the pool of the data are split into training data set and test data set is not limited to 70/30 and may be set according to a configurable accuracy requirement and/or error tolerance (e.g., the split can be 10/50, 60/40, 70/30, 80/20, 90/10, etc. between the two data sets).

The training subsystem can then use the training dataset (e.g., the multilingual embeddings 314 and the corresponding labels 308) to train the machine-learning model 302 by calculating a loss based on a comparison between an output generated from the machine-learning model and a corresponding label of the training data. With each output generated by the machine-learning model 302, the label can thus be used to correct the output of the machine-learning model 302. In some instances, reinforcement learning is additionally performed by utilizing feedback from users to adjust the corresponding parameters of the machine-learning model. As noted, weights of different nodes of the machine-learning model 302 may be adjusted/tuned during the training process to improve resulting output.

During training, weights of nodes associated with the machine-learning model 302 can be adjusted using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training media data until the weights of the layers are accurately tuned. In particular, the training of the machine-learning model 302 (e.g., adjustment of the weights) can be performed until a corresponding loss (e.g., a mean square error) reaches a minimum threshold.

Once trained, the training system can test the machine-learning model 302 using the test data set. Examples of testing methods can include regression testing, unit testing, beta testing, and alpha testing. Once the result of testing the machine-learning model 302 is satisfactory (e.g., when outputs of the testing stage is greater than or equal to a threshold or incorrect detections are less than a threshold), the training system can deploy the trained machine-learning model 302 (which may also be referred to as a trained machine learning model or machine trained neural network) to an NLP tool, which can use the trained machine-learning model 302 to perform the NLP tasks.

5. Deployment

After accessing the trained machine-learning model 302, the training system can deploy the machine-learning model 302 to perform the NLP task. The machine learning model can process unlabeled input data in different languages to perform various NLP tasks such as text classification, sentiment analysis, language identification, language generation, etc.

As described herein, the machine-learning models can be trained using the multilingual embeddings 314 to implement a variety of NLP tasks in different languages. In some instances, the labels 308 that identify different characteristics of the text segments (e.g., intent, entities, sentiment) are used to further train the machine-learning models, such that the trained machine-learning model recognizes content and different patterns associated with the inputted text.

An example NLP task includes text generation systems that can generate text based on a given input or seed text in different languages. These systems can be used for tasks such as summarization, text completion, and language-based creative tasks in target languages. For the text generation systems, the machine-learning model can be a BART network, generative pre-trained transformer (GPT), or Generative adversarial networks (GAN) that is trained using the multilingual embeddings 314 to facilitate generating text in target languages (e.g., Korean, Spanish). In some instances, the machine-learning model performs abstractive summarization to create new text segments that are not described in the source documents but still convey similar meaning.

Another example NLP task can include dialogue systems such as chatbots, virtual assistants, and interactive language-based games that can process different languages. For the dialogue systems, the machine-learning model can include a Naïve Bayes algorithm, a support vector machine, recurrent neural networks (RNN), long short-term memory (LSTM) networks, or Markov models that can be trained using the multilingual embeddings 314 to facilitate generating text in dialogue systems in target languages.

The NLP task can also include sentiment analysis and opinion mining systems for analyzing sentiments in text data across different languages. The machine-learning model can be an artificial neural network trained using the multilingual embeddings 314 and the target labels 308 that indicate a sentiment associated with a corresponding text segment (e.g., positive, negative, neutral). Similar to sentiment analysis, named-entity recognition and text classification systems (e.g., hate-speech classification) can be implemented using the machine-learning models, in which the machine-learning models can be trained using the multilingual embeddings 314 and the target labels 308 that indicate whether a corresponding text segment includes hate speech (for example).

Figure 4:
FIG. 4 shows experimental results for evaluating sentiment analysis performed by machine-learning models trained using multilingual embeddings, according to some embodiments.

FIG. 4 shows experimental results 400 for evaluating sentiment analysis performed by machine-learning models trained using multilingual embeddings, according to some embodiments. The numbers represent the change in f1 micro (the harmonic mean of precision and recall) performance across different languages (e.g., English, Arabic, Russian, Spanish) and specific labels in the multi-label text classifier before and after adding translated samples to the training. Source data was labeled in English.

As shown by the f1 scores, the machine-learning models trained using multilingual embeddings performed show substantial performance improvement from baseline models across different target languages (e.g., Arabic, Russian, Spanish). For example, the f1 score for classifying Arabic text as "disgust" is 0.03 for the baseline model, whereas the f1 score for the same text classification is 0.18 for the model trained with the multilingual embeddings. In another example, the f1 score for classifying Russian text as "sadness" is 0.02 for the baseline model, whereas the f1 score for the same text classification is 0.54 for the model trained with the multilingual embeddings. Accordingly, the machine-learning models trained using multilingual embeddings can accurately perform NLP tasks, while achieving increased efficiency in training the machine-learning models.

B. Methods

FIG. 5 shows an illustrative example of a process 500 for training a machine-learning model using multilingual embeddings generated from a trained word-embedding model, in accordance with some embodiments. For illustrative purposes, the process 500 is described with reference to the components illustrated in FIG. 3, though other implementations are possible. For example, the program code for the training system is executed by one or more processing devices to cause a server system (e.g., the computing device 602 of FIG. 6) to perform one or more operations described herein.

At step 502, a training system receives a source document that includes text segments associated with a source language. The source document can be any data object that includes text and/or images, including news articles, reports, white papers, text messages, web pages, and emails. The source document can include structured and/or unstructured text data and can be accessed from internal and/or external databases. In some instances, text of the source document is extracted from other types of media content, such as audio or video recordings. For example, the source document can include conversation data between two or more users or text extracted from short-form video content accessed from a social-media platform. The source language can correspond to any type of language used by users. Examples of source languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, one or more of the text segments are associated with a target label. A text segment can include any type of a linguistic unit, including words, phrases, sentences, or paragraphs. The target label can identify one or more characteristics of a corresponding text segment of the source document.

At step 504, the training system translates the text of the source document to generate a set of translated documents. The one or more translated documents of the set can include text associated with a target language. The target language can include any type of language that is different from the source language of the source documents 106. Examples of target languages can include, but are not limited to, English, Mandarin, Hindi, Spanish, French, Arabic, Bengali, Russian, Portuguese, Urdu, Indonesian, German, Japanese, Hebrew, Turkish, Korean, Vietnamese, and Thai.

In some instances, translating the text of the source document includes applying a machine-translation algorithm to the source document to generate the set of translated documents. Machine translation can include rule-based approaches to translation of text or speech from one language to another, including the contextual, idiomatic and pragmatic nuances of both languages. In some instances, the machine translation also includes machine-learning techniques for processing the source documents to generate the set of translated documents. Examples of the machine-translation algorithm can include, but are not limited to, GOOGLE Translate (google.com/translate), MICROSOFT Translator (microsofttranslator.com), PROMT (promt.com), SYSTRAN (systransoft.com), and IBM n.Fluent (www.re-search.ibm.com/social/projects_nfluent.html).

At step 506, the training system generates a set of labeled multilingual documents. Generating the set of labeled multilingual documents can include mapping the target label of the source document to corresponding text segments of the set of translated documents. For example, mapping can be performed by iterating through each text segment of the source documents, such that any n-th text segment having the target label can be mapped to a corresponding n-th text segment of the translated documents. The mapping of the target labels 108 can eliminate the need of manual annotation in target languages, thus reducing the cost and effort required for creating the training data set.

At step 508, the training system encodes the text of the set of labeled multilingual documents into a plurality of multilingual embeddings. A multilingual embedding can include a set of values (e.g., a numerical array) that represent text tokens of the multilingual documents in a low-dimensional vector space, in which the multilingual embedding can be used as input to the machine-learning model. Example techniques for generating embeddings can include term frequency-inverse document frequency (TF-IDF) techniques, bag-of-words, and tokenization techniques.

In some instances, a word-embedding model is applied to the text of the set of labeled multilingual documents to generate the plurality of multilingual embeddings. The word-embedding model can be a machine-learning model trained to encode individual words into real-valued vectors in a lower-dimensional space, in which words with similar meanings would be represented in similar values. Examples of the word-embedding model can include a GloVe model or a Word2Vec model.

In some instances, the word-embedding model can be trained using an embedding-training dataset that includes a corpus of unlabeled documents associated with the target language. For example, at step 510, a set of unlabeled documents that are associated with the target language can be accessed. At step 512, the word-embedding model can be trained using the set of unlabeled documents associated with the target language. At step 514, parameters of the trained word-embedding model can be fine-tuned using the set of translated documents or the set of multilingual documents that were generated from the source documents. In some instances, the word-embedding model is a pre-trained model that was previously trained using public datasets, which can be fine-tuned using the set of multilingual documents.

At step 516, the training system trains a machine-learning model using the plurality of multilingual embeddings. Training the machine-learning model includes: (i) applying the machine-learning model to the plurality of multilingual embeddings to generate an initial output; (ii) comparing the initial output with the target label; and adjusting parameters of the machine-learning model based on the comparison such that the trained machine-learning model generates a target output that corresponds to the target label.

In some instances, the machine-learning model is trained to predict whether a particular document includes narrative attacks against one or more entities, in which the target label identifies a classification indicating whether the text of the source language includes the narrative attack. Additionally or alternatively, the machine-learning model is trained to perform a sentiment analysis for a particular document, in which the target label identifies a particular sentiment associated with the text of the source language. Process 500 terminates thereafter.

III. Example Systems

Figure 6:
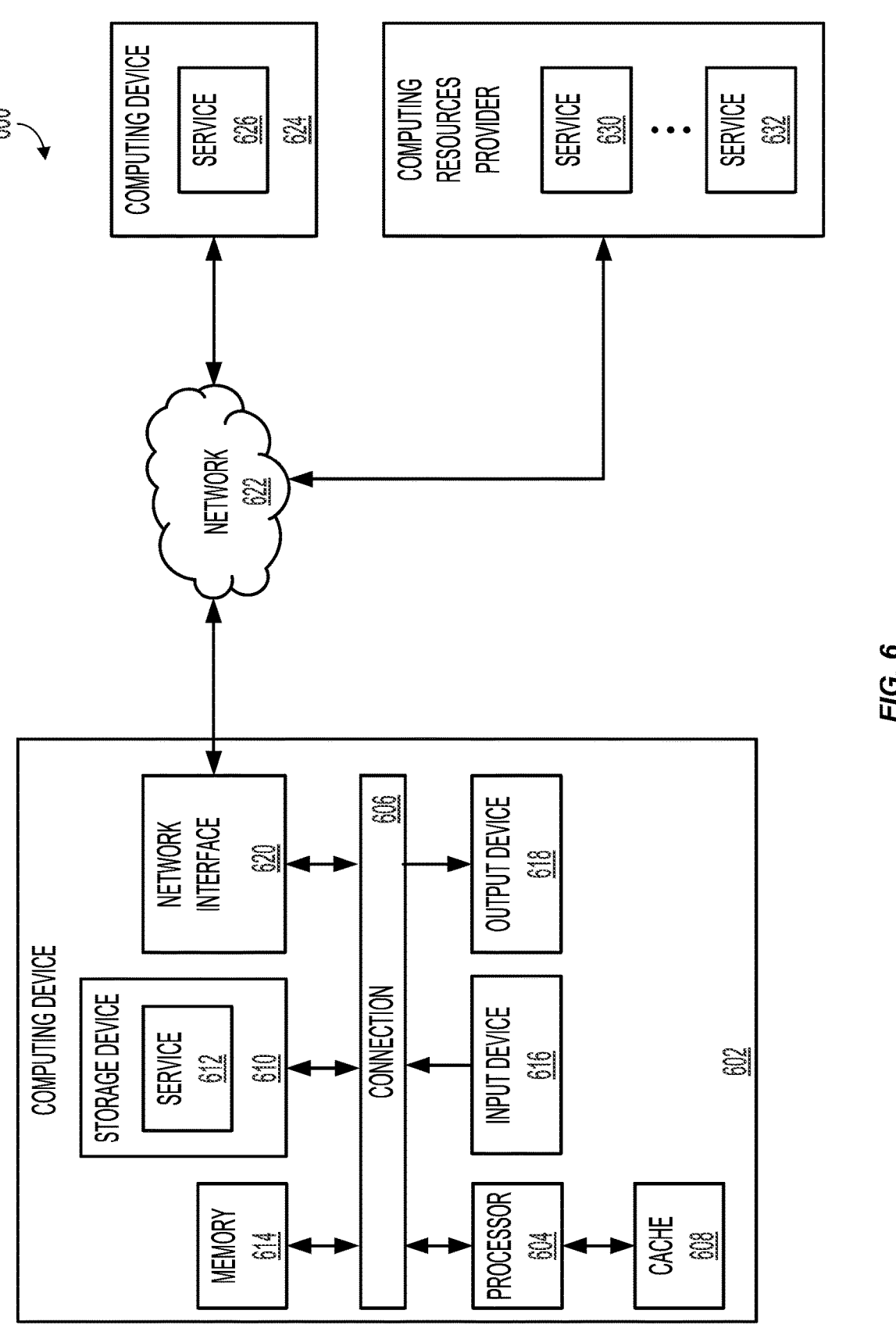
FIG. 6 shows a computing system architecture including various components in electrical communication with each other using a connection in accordance with various embodiments.

FIG. 6 illustrates a computing system architecture 600, including various components in electrical communication with each other, in accordance with some embodiments. The example computing system architecture 600 illustrated in FIG. 6 includes a computing device 602, which has various components in electrical communication with each other using a connection 606, such as a bus, in accordance with some implementations. The example computing system architecture 600 includes a processing unit 604 that is in electrical communication with various system components, using the connection 606, and including the system memory 614. In some embodiments, the system memory 614 includes read-only memory (ROM), random-access memory (RAM), and other such memory technologies including, but not limited to, those described herein. In some embodiments, the example computing system architecture 600 includes a cache 608 of high-speed memory connected directly with, in close proximity to, or integrated as part of the processor 604. The system architecture 600 can copy data from the memory 614 and/or the storage device 610 to the cache 608 for quick access by the processor 604. In this way, the cache 608 can provide a performance boost that decreases or eliminates processor delays in the processor 604 due to waiting for data. Using modules, methods and services such as those described herein, the processor 604 can be configured to perform various actions. In some embodiments, the cache 608 may include multiple types of cache including, for example, level one (L1) and level two (L2) cache. The memory 614 may be referred to herein as system memory or computer system memory. The memory 614 may include, at various times, elements of an operating system, one or more applications, data associated with the operating system or the one or more applications, or other such data associated with the computing device 602.

Other system memory 614 can be available for use as well. The memory 614 can include multiple different types of memory with different performance characteristics. The processor 604 can include any general purpose processor and one or more hardware or software services, such as service 612 stored in storage device 610, configured to control the processor 604 as well as a special-purpose processor where software instructions are incorporated into the actual processor design. The processor 604 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 604 can be a microprocessor, a microcontroller, a digital signal processor ("DSP"), or a combination of these and/or other types of processors. In some embodiments, the processor 604 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 600, an input device 616 can represent any number of input mechanisms, such as a microphone for speech, a touch-sensitive screen for gesture or graphical input, keyboard, mouse, motion input, pen, and other such input devices. An output device 618 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 600. In some embodiments, the input device 616 and/or the output device 618 can be coupled to the computing device 602 using a remote connection device such as, for example, a communication interface such as the network interface 620 described herein. In such embodiments, the communication interface can govern and manage the input and output received from the attached input device 616 and/or output device 618. As may be contemplated, there is no restriction on operating on any particular hardware arrangement and accordingly the basic features here may easily be substituted for other hardware, software, or firmware arrangements as they are developed.

In some embodiments, the storage device 610 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 610 can include hardware and/or software services such as service 612 that can control or configure the processor 604 to perform one or more functions including, but not limited to, the methods, processes, functions, systems, and services described herein in various embodiments. In some embodiments, the hardware or software services can be implemented as modules. As illustrated in example computing system architecture 600, the storage device 610 can be connected to other parts of the computing device 602 using the system connection 606. In some embodiments, a hardware service or hardware module such as service 612, that performs a function can include a software component stored in a non-transitory computer-readable medium that, in connection with the necessary hardware components, such as the processor 604, connection 606, cache 608, storage device 610, memory 614, input device 616, output device 618, and so forth, can carry out the functions such as those described herein.

The disclosed systems and service of a training system for training machine-learning models can be performed using a computing system such as the example computing system illustrated in FIG. 6, using one or more components of the example computing system architecture 600. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for training a machine-learning model using machine translation and multilingual embeddings described herein by, for example, executing code using a processor such as processor 604 wherein the code is stored in memory such as memory 614 as described herein. One or more of a user device, a provider server or system, a database system, or other such devices, services, or systems may include some or all of the components of the computing system such as the example computing system illustrated in FIG. 6, using one or more components of the example computing system architecture 600 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 628. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 604 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 614 can be coupled to the processor 604 by, for example, a connector such as connector 606, or a bus. As used herein, a connector or bus such as connector 606 is a communications system that transfers data between components within the computing device 602 and may, in some embodiments, be used to transfer data between computing devices. The connector 606 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 614 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 614 can also include magnetic or optical data storage media including read-only (e.g., CD ROM and DVD ROM) or otherwise (e.g., CD or DVD). The memory can be local, remote, or distributed.

As described above, the connector 606 (or bus) can also couple the processor 604 to the storage device 610, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 610. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 606 can also couple the processor 604 to a network interface device such as the network interface 620. The interface can include one or more of a modem or other such network interfaces including, but not limited to those described herein. It will be appreciated that the network interface 620 may be considered to be part of the computing device 602 or may be separate from the computing device 602. The network interface 620 can include one or more of an analog modem, Integrated Services Digital Network (ISDN) modem, cable modem, token ring interface, satellite transmission interface, or other interfaces for coupling a computer system to other computer systems. In some embodiments, the network interface 620 can include one or more input and/or output (I/O) devices. The I/O devices can include, by way of example but not limitation, input devices such as input device 616 and/or output devices such as output device 618. For example, the network interface 620 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 602 can be connected to one or more additional computing devices such as computing device 624 via a network 622 using a connection such as the network interface 620. In such embodiments, the computing device 624 may execute one or more services 626 to perform one or more functions under the control of, or on behalf of, programs and/or services operating on computing device 602. In some embodiments, a computing device such as computing device 624 may include one or more of the types of components as described in connection with computing device 602 including, but not limited to, a processor such as processor 604, a connection such as connection 606, a cache such as cache 608, a storage device such as storage device 610, memory such as memory 614, an input device such as input device 616, and an output device such as output device 618. In such embodiments, the computing device 624 can carry out the functions such as those described herein in connection with computing device 602. In some embodiments, the computing device 602 can be connected to a plurality of computing devices such as computing device 624, each of which may also be connected to a plurality of computing devices such as computing device 624. Such an embodiment may be referred to herein as a distributed computing environment.

The network 622 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IOT network) or any other such network or combination of networks. Communications via the network 622 can be wired connections, wireless connections, or combinations thereof. Communications via the network 622 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 622, within the computing device 602, within the computing device 624, or within the computing resources provider 628 can include information, which also may be referred to herein as content. The information may include text, graphics, audio, video, haptics, and/or any other information that can be provided to a user of the computing device such as the computing device 602. In some embodiments, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 602 and presented to a user of the computing device 602 using forms that are perceptible via sight, sound, smell, taste, touch, or other such mechanisms. In some embodiments, communications over the network 622 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 602 and/or the computing device 624 can be connected to a computing resources provider 628 via the network 622 using a network interface such as those described herein (e.g. network interface 620). In such embodiments, one or more systems (e.g., service 630 and service 632) hosted within the computing resources provider 628 (also referred to herein as within "a computing resources provider environment") may execute one or more services to perform one or more functions under the control of, or on behalf of, programs and/or services operating on computing device 602 and/or computing device 624. Systems such as service 630 and service 632 may include one or more computing devices such as those described herein to execute computer code to perform the one or more functions under the control of, or on behalf of, programs and/or services operating on computing device 602 and/or computing device 624.

For example, the computing resources provider 628 may provide a service, operating on service 630 to store data for the computing device 602 when, for example, the amount of data that the computing device 602 exceeds the capacity of storage device 610. In another example, the computing resources provider 628 may provide a service to first instantiate a virtual machine (VM) on service 632, use that VM to access the data stored on service 632, perform one or more operations on that data, and provide a result of those one or more operations to the computing device 602. Such operations (e.g., data storage and VM instantiation) may be referred to herein as operating "in the cloud," "within a cloud computing environment," or "within a hosted virtual machine environment," and the computing resources provider 628 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 628 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, server-less hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 630 and service 632 may implement versions of various services (e.g., the service 612 or the service 626) on behalf of, or under the control of, computing device 602 and/or computing device 624. Such implemented versions of various services may involve one or more virtualization techniques so that, for example, it may appear to a user of computing device 602 that the service 612 is executing on the computing device 602 when the service is executing on, for example, service 630. As may also be contemplated, the various services operating within the computing resources provider 628 environment may be distributed among various systems within the environment as well as partially distributed onto computing device 624 and/or computing device 602.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 602) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example process 200 of FIG. 2). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, linear classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistants (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 602.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 45 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:

receiving a source document that includes text segments associated with a source language, wherein one or more of the text segments are associated with a target label;

translating the text of the source document to generate a set of translated documents, wherein one or more translated documents of the set include text associated with a target language;

generating a set of labeled multilingual documents, wherein generating the set of labeled multilingual documents includes mapping the target label of the source document to corresponding text segments of the set of translated documents;

encoding the text of the set of labeled multilingual documents into a plurality of multilingual embeddings; and training a machine-learning model using the plurality of multilingual embeddings, wherein the machine-learning model is trained to predict whether a particular document includes narrative attacks against one or more entities, and wherein training the machine-learning model includes:

applying the machine-learning model to the plurality of multilingual embeddings to generate an initial output;

comparing the initial output with the target label, wherein the target label identifies a classification indicating whether the text of the source language includes the narrative attacks; and adjusting parameters of the machine-learning model based on the comparison such that the trained machine-learning model generates a target output that corresponds to the target label.

2. The computer-implemented method of claim 1, wherein encoding the text of the set of labeled multilingual documents includes applying a word-embedding model to the text of the set of labeled multilingual documents to generate the plurality of multilingual embeddings, wherein the word-embedding model is trained using a set of unlabeled documents, and wherein the set of unlabeled documents include text associated with the target language.

3. The computer-implemented method of claim 2, wherein the word-embedding model is further trained using the set of labeled multilingual documents.

4. The computer-implemented method of claim 1, wherein the machine-learning model is trained to perform a sentiment analysis for a particular document, wherein the target label identifies a particular sentiment associated with the text of the source language.

5. The computer-implemented method of claim 1, wherein the source document is accessed from a social-media platform.

6. The computer-implemented method of claim 1, wherein translating the text of the source document includes applying a machine-translation algorithm to the source document to generate the set of translated documents.

7. A system comprising:

one or more processors; and memory storing thereon instructions that, as a result of being executed by the one or more processors, cause the system to perform operations comprising:

receiving a source document that includes text segments associated with a source language, wherein one or more of the text segments are associated with a target label;

translating the text of the source document to generate a set of translated documents, wherein one or more translated documents of the set include text associated with a target language;

generating a set of labeled multilingual documents, wherein generating the set of labeled multilingual documents includes mapping the target label of the source document to corresponding text segments of the set of translated documents;

encoding the text of the set of labeled multilingual documents into a plurality of multilingual embeddings; and training a machine-learning model using the plurality of multilingual embeddings, wherein the machine-learning model is trained to predict whether a particular document includes narrative attacks against one or more entities, and wherein training the machine-learning model includes:

applying the machine-learning model to the plurality of multilingual embeddings to generate an initial output;

comparing the initial output with the target label, wherein the target label identifies a classification indicating whether the text of the source language includes the narrative attacks; and adjusting parameters of the machine-learning model based on the comparison such that the trained machine-learning model generates a target output that corresponds to the target label.

8. The system of claim 7, wherein encoding the text of the set of labeled multilingual documents includes applying a word-embedding model to the text of the set of labeled multilingual documents to generate the plurality of multilingual embeddings, wherein the word-embedding model is trained using a set of unlabeled documents, and wherein the set of unlabeled documents include text associated with the target language.

9. The system of claim 8, wherein the word-embedding model is further trained using the set of labeled multilingual documents.

10. The system of claim 7, wherein the machine-learning model is trained to perform a sentiment analysis for a particular document, wherein the target label identifies a particular sentiment associated with the text of the source language.

11. The system of claim 7, wherein the source document is accessed from a social-media platform.

12. The system of claim 7, wherein translating the text of the source document includes applying a machine-translation algorithm to the source document to generate the set of translated documents.

13. A non-transitory, computer-readable storage medium storing thereon executable instructions that, as a result of being executed by one or more processors of a computer system, cause the computer system to perform operations comprising:

receiving a source document that includes text segments associated with a source language, wherein one or more of the text segments are associated with a target label;

translating the text of the source document to generate a set of translated documents, wherein one or more translated documents of the set include text associated with a target language;

generating a set of labeled multilingual documents, wherein generating the set of labeled multilingual documents includes mapping the target label of the source document to corresponding text segments of the set of translated documents;

encoding the text of the set of labeled multilingual documents into a plurality of multilingual embeddings; and training a machine-learning model using the plurality of multilingual embeddings, wherein the machine-learning model is trained to predict whether a particular document includes narrative attacks against one or more entities, and wherein training the machine-learning model includes:

applying the machine-learning model to the plurality of multilingual embeddings to generate an initial output;

comparing the initial output with the target label, wherein the target label identifies a classification indicating whether the text of the source language includes the narrative attacks; and adjusting parameters of the machine-learning model based on the comparison such that the trained machine-learning model generates a target output that corresponds to the target label.

14. The non-transitory, computer-readable storage medium of claim 13, wherein encoding the text of the set of labeled multilingual documents includes applying a word-embedding model to the text of the set of labeled multilingual documents to generate the plurality of multilingual embeddings, wherein the word-embedding model is trained using a set of unlabeled documents, and wherein the set of unlabeled documents include text associated with the target language.

15. The non-transitory, computer-readable storage medium of claim 14, wherein the word-embedding model is further trained using the set of labeled multilingual documents.

16. The non-transitory, computer-readable storage medium of claim 13, wherein the machine-learning model is trained to perform a sentiment analysis for a particular document, wherein the target label identifies a particular sentiment associated with the text of the source language.

17. The non-transitory, computer-readable storage medium of claim 13, wherein translating the text of the source document includes applying a machine-translation algorithm to the source document to generate the set of translated documents.

* * * * *